Dec. 26, 1944.　　　M. A. POWERS　　　2,365,902
METHOD OF FABRICATING POROUS PRODUCTS
Filed July 12, 1941
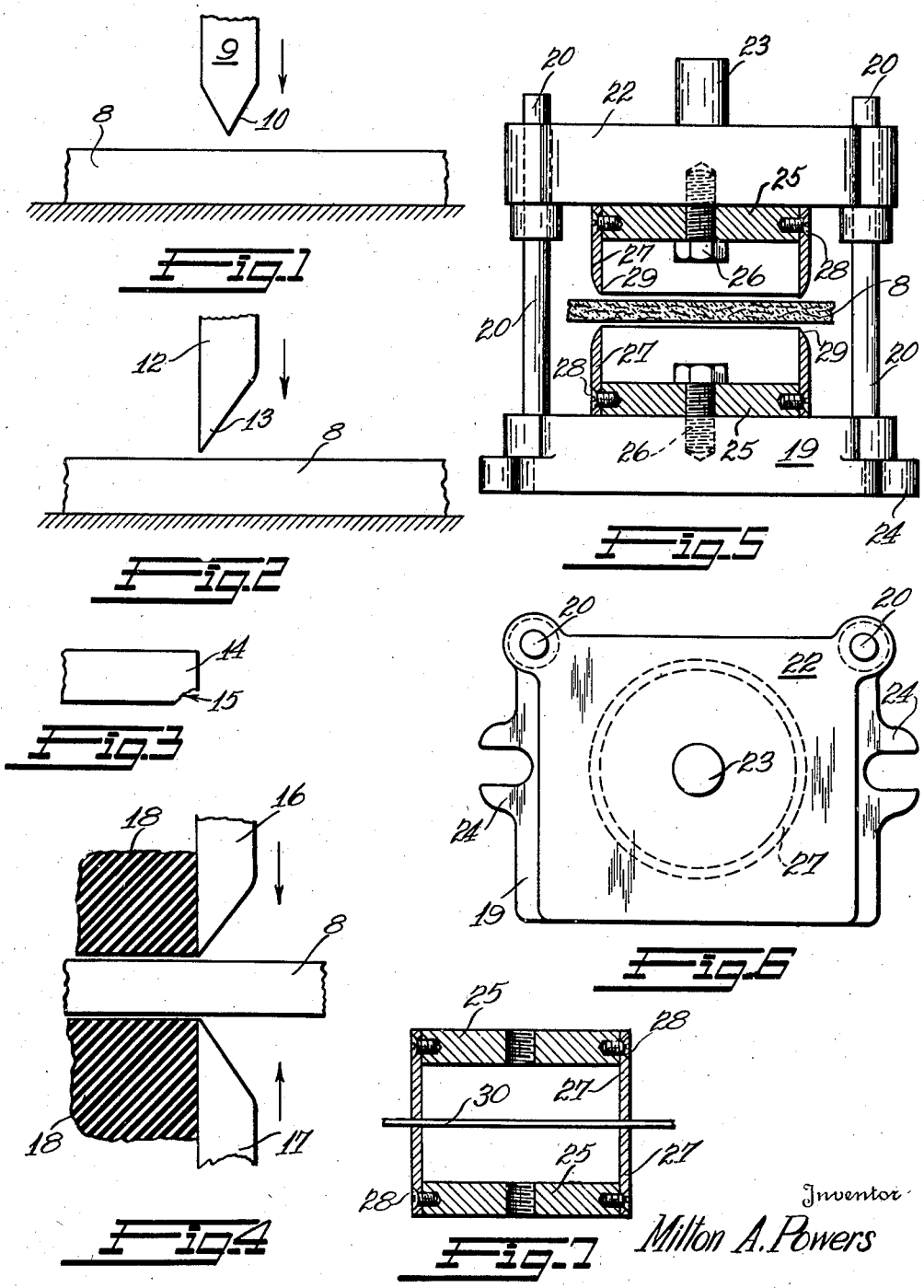
Inventor
Milton A. Powers
By Ralph L. Stevens
Attorney Patented Dec. 26, 1944

2,365,902

UNITED STATES PATENT OFFICE 2,365,902

METHOD OF FABRICATING POROUS PRODUCTS

Milton A. Powers, Detroit, Mich.

Application July 12, 1941, Serial No. 402,256

3 Claims. (Cl. 164—17)

The present invention relates to methods of fabricating porous products—particularly those that are brittle or otherwise somewhat frangible—by steps including a die-cutting operation.

In my copending application, Serial No. 303,277, filed November 7, 1939 (now Patent No. 2,271,829, granted February 3, 1942), I have disclosed certain "Porous products and their manufacture." These products consisted of glass wool, heated to a point where the felted wool collapsed until its individual elements formed (when cooled) a porous hard mass of intermingled fibres. Such products normally were in the form of rigid porous plates, each without the aid of a microscope appearing to have a snow-like and substantially glassy smooth surface. Actually depending upon the finishing steps of the heating and chilling process the plate surface might be either smooth or rough and abrasive to the touch, but in all events when placed under a microscope would reveal a multiplicity of minute glass rods, intertwined and welded one to another to form a rigid network.

The interwelded rods of such a plate give it considerable strength and rigidity because they are disposed like matted hair, but at the same time there is very appreciable resiliency in the plate due to the bending or fibre characteristic of each rod. Most or all of the rods normally are less than 0.005 inch in diameter and hence can be bent or distorted considerably before breaking. Thus the particular product is unusual and may be said to be "resiliently brittle." It can be roughly handled without damage, and usually a relatively thin plate can be dropped upon a hard floor without breaking. It further can be drilled and sawed much in the same manner as dry soft wood. However, when one attempts to cut or punch out a set of plates from a blank economically and therefore at high speed, one encounters the disadvantage that such material reacts with one or more of the characteristics of crushing, chipping and fracture—this being particularly true when attempting to cut plates of large area out of a blank of the sheet material. The surprising ease with which the material can be drilled or sawed apparently is due to a progressive breaking of the glass rods or fibres, one after another; whereas in a punching or normal die-cutting operation a crushing force is transmitted to the internal fibres before they can be reached by the metal cutting edges of the die.

For example, utilizing a die formed of male and female members which approach each other with a shearing action, unless the glass sheet is very thin there is a marked tendency to shatter the material inwardly adjacent the line of cut, and later the edges of the die-cut specimens may flake off to become rough and irregular. Also, very frequently a crack will progress across the specimen either during or after the cutting operation.

Accordingly, it is the primary object of the present invention to devise methods and means for rapidly cutting a product of desired shape out of a blank of the material just discussed or any material having similar characteristics.

More specifically, it is a major object to divide a blank of such material into parts of desired shape by a stamping or die-cutting operation in such manner that the edges of the parts will not be shattered or subject to subsequent crumbling.

It is a further important object of this invention to devise a new and improved die pair and a novel and simple method of manufacturing the pair of dies.

These and further objects of my invention will clearly appear from a study of the following descriptive and explanatory matter when taken in conjunction with the accompanying drawing and the appended claims.

In the drawing:

Fig. 1 is a diagrammatic showing of one cutting die, and the corresponding method. This is the least desirable form of the present invention;

Fig. 2 is a similar view of a modification.

Fig. 3 is an elevational view of a portion of the product cut in Fig. 2, with its edge broken as sometimes occurs when operating by this method;

Fig. 4 is a diagrammatic representation of a preferred and by far the most satisfactory form of my invention;

Fig. 5 is a side elevational view, with the dies in section, of a suitable die holding and operating means for practicing the invention of Fig. 4;

Fig. 6 is a top plan view of the apparatus of Fig. 5; and

Fig. 7 illustrates, in vertical section, one step of a preferred method of constructing the dies of Figs. 4–6.

With continued reference to the drawing, wherein like numerals are employed to designate like parts, and with particular reference for the moment to Fig. 1, numeral 8 indicates a blank or sheet of porous material such as the vitrified wool previously discussed, and 9 represents a die having a cutting edge 10. For simplicity of illustration in this view and in Figs. 2 and 4 as well, the dies are shown as straight knives, but usually in practice they will be endless knives somewhat like cookie cutters, generally like the dies of Fig. 5.

The arrangement of Fig. 1 is an improvement over a pair of dies operating upon a shearing principle, but it is subject to the objection that the inclined sides of the cutting edge 10 have a tendency to spread and crush the top portion of the plate 8 as the die descends—this being almost a frequent occurrence regardless of the sharpness of the edge.

Much better results are obtainable with the arrangement of Fig. 2, wherein the die 12 has a cutting edge 13 that is absolutely vertical on that side which is to engage the product cut from the blank. However, unless the blank is quite thin the product 14 (Fig. 3) cut from the blank will have an occasional tendency to chip in the region of the bottom of its edge, as indicated at 15 in Fig. 3.

Uniformly excellent results are obtained when operating upon the principle disclosed in Fig. 4. Here a pair of dies, 16, 17, are employed, having matched cutting edges of identical contour and disposed in substantially perfect vertical alignment so that they come together with precision when they meet at the central plane of the blank being cut. Actually, to avoid wear, the cutting edges do not engage each other but they approach so closely that the minute thickness of uncut material permits the divided parts to be separated without damage or visible roughness.

The arrows in Fig. 4 indicate that both dies are in motion, but it should be understood that either one of them may be held stationary, the important requisite being that each die bites through approximately one half of the thickness of the blank. Each die may be said, therefore, to operate upon the principle disclosed in Fig. 2 but upon a blank of only one half the thickness of that of Fig. 2, so that the occasional damage illustrated in Fig. 3 is obviated.

The elements 18 of Fig. 4 are blocks of sponge rubber or the like, shaped to fit within and conform to the internal walls of the dies and designed to be pressed against the top and bottom surfaces of the plate that is being cut from the blank of material. They may be brought into such engagement by frictional contact with the dies, the friction being insufficient to prevent the latter from sliding past them when the cutting edges enter the blank. These rubber blocks serve to steady and cushion the blank against the shock of die impingement and the shattering tendency resulting from the cutting operation. Spring loaded supporting plates or other equivalent means might be substituted for the sponge rubber devices for engagement with the portions of the blank to be cut.

Another expedient, for about the same purpose as the stabilizing and shock absorbing means just described, consists in wetting the porous blank prior to the cutting cycle. My vitrified glass wool will absorb about twice its weight of water very quickly. The absorbed water seems to give the blank fluidic or plastic properties, and not only stabilizes or cushions the blank but also affords a better, cleaner cut. None of these expedients is indispensable but preferably it is adopted for the sake of economy in production. It permits uniformly excellent results to be obtained while operating at very high speed, the entire cutting step being performed in about 1/300 second.

A practical apparatus for performing the method of Fig. 4 is shown in Figs. 5 and 6. A conventional set of die holders is disclosed, comprising a base 19 having a pair of vertical guide rods 20 which slidably receive a reciprocating member 22, the latter having an integral stem 23 designed to be secured to a power-operated mechanism (not shown). The base 19 has fork-shaped lugs 24 through which it may be secured to a stationary foundation. Metal plates 25 are secured to the base and the member 22 respectively by a pair of cap screws 26. Each plate carries a die 27, attached thereto by a plurality of screws 28, these dies being of identical conformation and provided with cutting edges 29 that are in vertical alignment.

The sheet of material which forms the blank 8 is conveyed through the apparatus by suitable feeding and guiding means so that it is substantially in contact with the lower die when the upper die takes its downward stroke. The cutting edges 29 meet or almost come together in the central plane of the blank, whereupon the upper die is pulled away preparatory to the initiation of another rapid down-stroke of a new cycle.

A unique feature of the die set of Figs. 5 and 6 resides in its method of manufacture, the simplicity and cheapness of which is demonstrated in Fig. 7. Aside from economy, however, accurate matching of the dies of course is of prime importance. The method of Fig. 7 affords the factors of economy and accuracy, as follows.

The dies 27 are integral portions of a metal tube or sleeve that has been preformed to a length equal to the combined vertical depths of the dies and to a contour that corresponds to the outline of the plate-like product to be cut from the blank. For simplicity of illustration this contour is circular, but it may assume various curved and straight-line shapes and combinations of the two. The factor of chief importance is that the cross-sectional contour of the tube shall be substantially uniform. The members 25, cast or otherwise formed to fit within the ends of the tube, are attached to the tube by the screws 28. Thereafter, or just prior to this attachment step the tube is bisected in a horizontal plane, as by a saw 30 (Fig. 7). Then, by grinding the sawed edges to sharpen them into the shape seen at 29 (Fig. 5), the only further step consists in accurately securing the members 25 to their holders 19, 22 by the cap screws 26. The tube, of course need not be seamless, but may be formed of two or more vertical sections having their vertical edges matched and fitted together to afford desired contour.

It is understood, of course, that the steel of the seamless tube may be relatively soft initially, and subsequently hardened (at least in the knife-edges 29) to prolong the life of the dies. Furthermore, the cutting edges of the dies may be resharpened without changing their initial cutting contours or matched sharp edges.

It should be understood that the cutting operations above described may be performed at any time, including that phase where the compacted glass wool is just leaving the furnace oven in a somewhat plastic condition, although my invention is designed primarily for the purpose of dividing a rather brittle blank into useful units. Moreover, regardless of the time element and the condition or properties of the blank at the moment of cutting, the blank obviously may be partitioned by a bank or multiplicity of relatively reciprocating dies or by a pair of oscillating or revolving die-holders which are timed to approach each other in such manner as to cut one or a plurality of plates from the brittle blank of sheet material. Also one holder may be stationary while the other either reciprocates, or oscillates, or rotates.

wif,ttyment,posirw yposedwulo hrdl pu pu pui

Further modifications and alterations obviously fall within the spirit of the present invention. Therefore, I wish to be limited, as is customary and expected by statute and settled law, only by the scope of the appended claims.

What is claimed is:

1. A method of dividing a somewhat brittle and frangible sheet of material into a plurality of parts, comprising the steps of making two aligned cuts of approximately equal depths from opposite sides of the sheet, while controlling the depths of said cuts so that they almost but yet do not quite meet adjacent the central plane of the plate, and thereafter breaking the sheet into a plurality of parts along the line of cuts.

2. A method of cutting into a resiliently brittle piece of porous fibrous material without damage thereto, consisting in wetting the material and then cutting it while it has an absorbed liquid content in fluidic form.

3. A method of cutting into a porous and substantially rigid body comprising interlocked fibres that are resilient and non-absorbent, consisting in wetting the body to surround the fibres with liquid, and then cutting it while wet.

MILTON A. POWERS.